United States Patent [19]
Yamauchi et al.

[11] Patent Number: 5,369,530
[45] Date of Patent: Nov. 29, 1994

[54] STAY HOUSABLE TYPE MOTOR DRIVEN MIRROR

[75] Inventors: Yoshinori Yamauchi, Isehara; Masami Yamamoto, Machida; Masao Enomoto, Hadano, all of Japan

[73] Assignee: Ichikoh Industries Ltd., Tokyo, Japan

[21] Appl. No.: 774,983

[22] Filed: Oct. 17, 1991

[30] Foreign Application Priority Data

Oct. 24, 1990 [JP] Japan ................ 2-110475[U]
Oct. 24, 1990 [JP] Japan ................ 2-110476[U]
Apr. 18, 1991 [JP] Japan ................ 3-034636[U]

[51] Int. Cl.⁵ .......................... G02B 7/182
[52] U.S. Cl. ................... 359/874; 359/841; 359/872; 359/876; 359/877; 248/480; 248/476; 248/477
[58] Field of Search .......... 359/841, 872, 874, 876, 359/877, 881; 248/476, 477, 479, 480, 485, 486, 487

[56] References Cited

U.S. PATENT DOCUMENTS

| | | | |
|---|---|---|---|
| 4,626,083 | 12/1986 | Nakayama et al. | 359/877 |
| 4,832,477 | 5/1989 | Torii et al. | 248/478 |
| 4,919,526 | 4/1990 | Umekawa et al. | 359/877 |
| 4,981,349 | 1/1991 | Tamiya et al. | 359/877 |
| 4,982,926 | 1/1991 | Mori et al. | 359/877 |

FOREIGN PATENT DOCUMENTS

| | | | |
|---|---|---|---|
| 0150849 | 7/1986 | Japan | 359/841 |
| 0173745 | 7/1988 | Japan | 359/877 |
| 0001642 | 1/1989 | Japan | 359/877 |
| 3-22041 | 5/1991 | Japan | |

Primary Examiner—Loha Ben
Assistant Examiner—Thomas Robbins
Attorney, Agent, or Firm—Foley & Lardner

[57] ABSTRACT

A stay housable type motor driven mirror to be attached, for example, to a car body has a drive gear rotatably driven by a drive apparatus, a clutch gear adapted to fit idlingly onto the support shaft and engage with the drive gear, a clutch holder fitted onto the support shaft beneath the clutch gear in order to rotate the support shaft by its rotation, a clutch mechanism having a concave face and a convex face, each so formed on a lower face of the clutch gear and an upper face of the clutch holder as to engage with each other, and a spring pressing the clutch gear to make the concave face and the convex face of the clutch mechanism engaged with each other. Consequently, it is possible to install the clutch mechanism at a side of follower of a large diameter gear and to increase a design allowance of clutch holding torque. In addition, a height of a bracket case is made shorten, design flexibility of stay attachment to the car body. Increasing an interior space of the bracket case increases design allowance of size and arrangement of the constitutional parts of the mirror simplifying the attachment.

9 Claims, 10 Drawing Sheets

STAY HOUSABLE TYPE MOTOR DRIVEN MIRROR

BACKGROUND OF THE INVENTION

1. Field of the Invention

The present invention relates to a stay housable type motor driven mirror to be installed on vehicles and the like.

2. Description of the Prior art

According to well-known stay housable type motor driven mirrors of this kind, a foundation of a stay supporting a mirror of the vehicle is rotatably held in a bracket case to be attached to a body of the vehicle, and the stay is rotatably driven by a motor installed in the bracket case so as to controllably move the mirror.

According to such a conventional stay housable type motor driven mirror, a of relatively long is stay provided with a mirror glass and a mirror body, respectively attached to its top end and the stay is held or supported by a bracket case relatively small in size, so that when the bracket case attached to a vehicle body shakes a little, the top end of the stay connected to the bracket case largely shakes, because a small degree of shake of the bracket case attached to the vibrating vehicle body is magnified many times at the top end of the long stay, resulting in considerable shaking of the mirror device. In particular, ordinarily a radial-directed load is effected to the foundation of the stay when the drive motor transfer its power to the mirror device, and additionally windage or wind-breaking resistance attacks the mirror body at the top end of the stay, thereby play is apt to be generated between the bracket case and the stay. In addition, the conventional stay housable type motor driven mirror is adapted to directly drive or rotate the stay by the drive motor, resulting disadvantageously in a large drive mechanism such as a motor.

Accordingly, the applicant of the present invention developed, in order to solve the shortcomings of the conventional stay housable type motor driven mirror, a novel stay housable type motor driven mirror and filed it with the Japan Patent Office as Utility Model application No. 61-98885 (UM laid-open No. 3-22041). According to the applicant's device, a stay of the stay housable type motor driven mirror can be supported in a stable condition without any generation of play and additionally a drive mechanism of the mirror can be minituarized.

Figure 7:
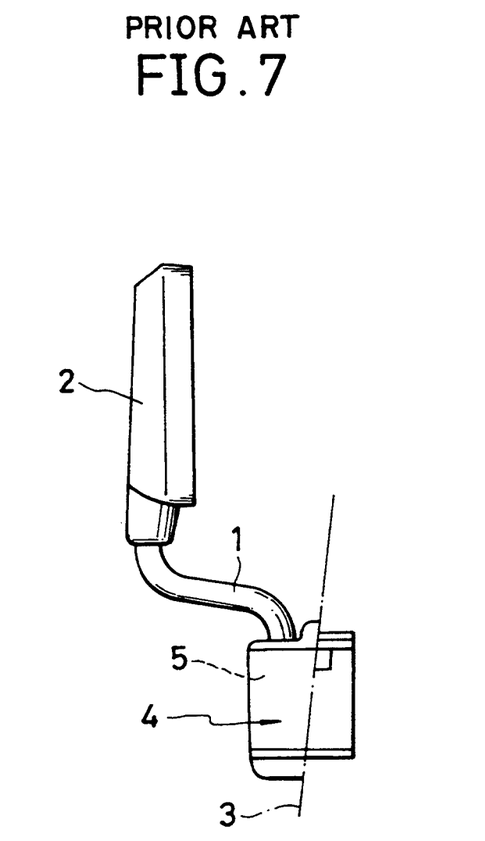
FIG. 7 is a side view of the stay housable type motor driven mirror.
Figure 8:
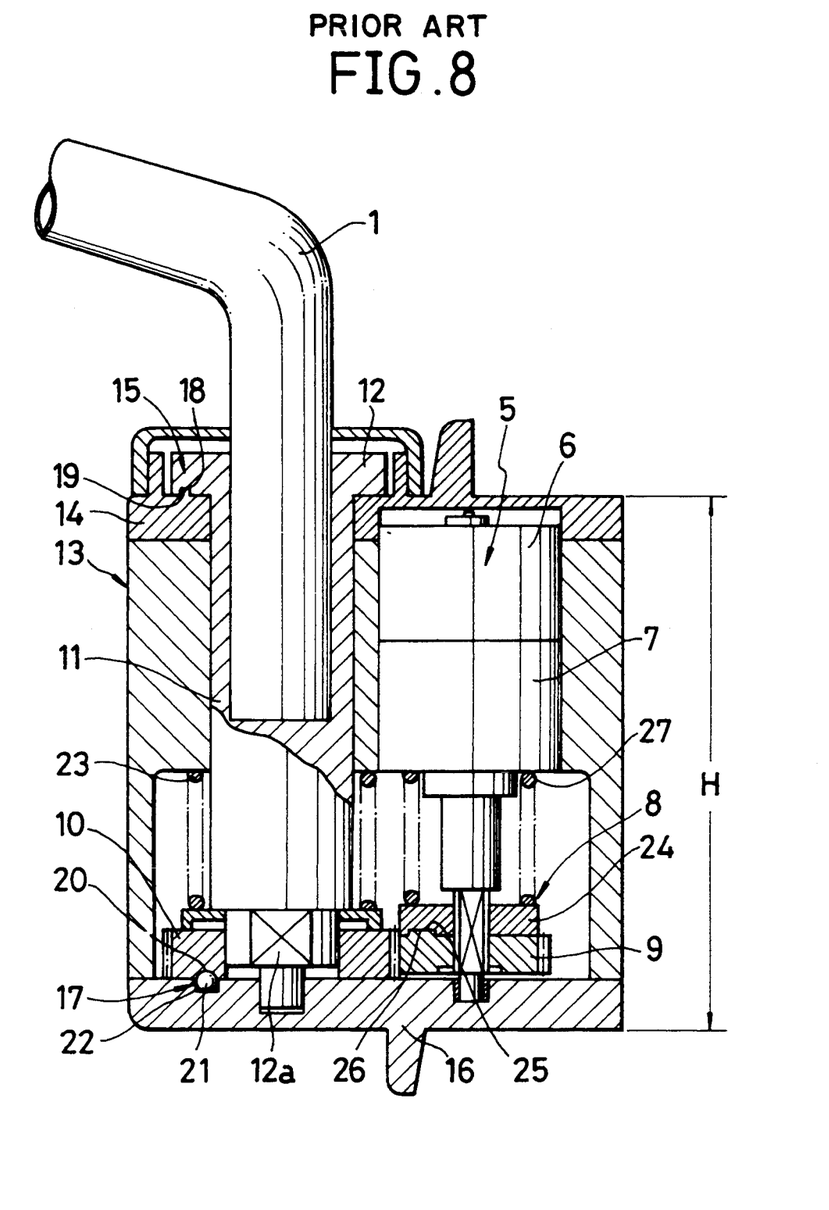
FIG. 8 is a longitudinal section showing an interior construction of one example of the conventional stay housable type motor driven mirror.
Figure 9:
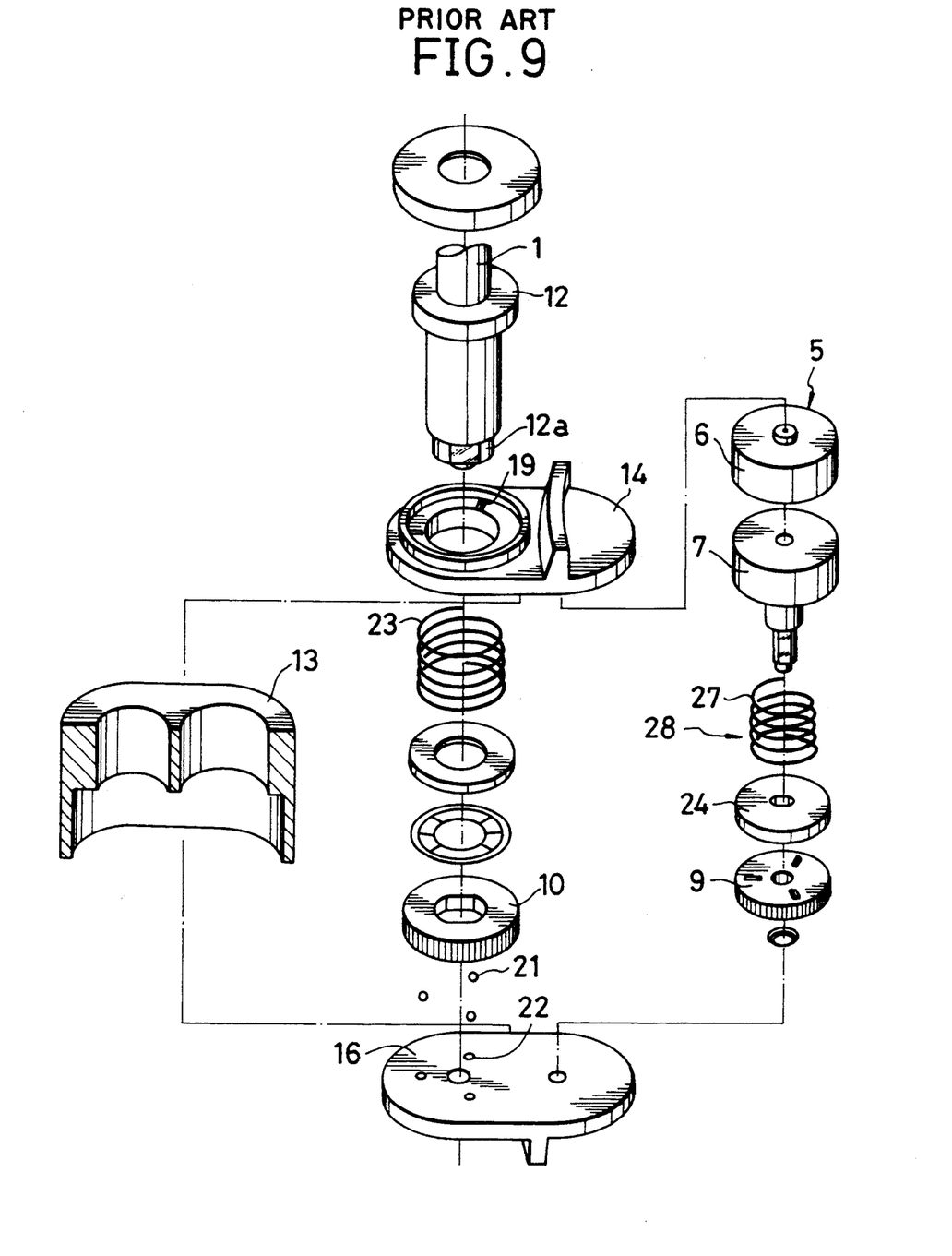
FIG. 9 is an exploded perspective view of the conventional stay housable type motor driven mirror shown in FIG. 8.
Figure 10:
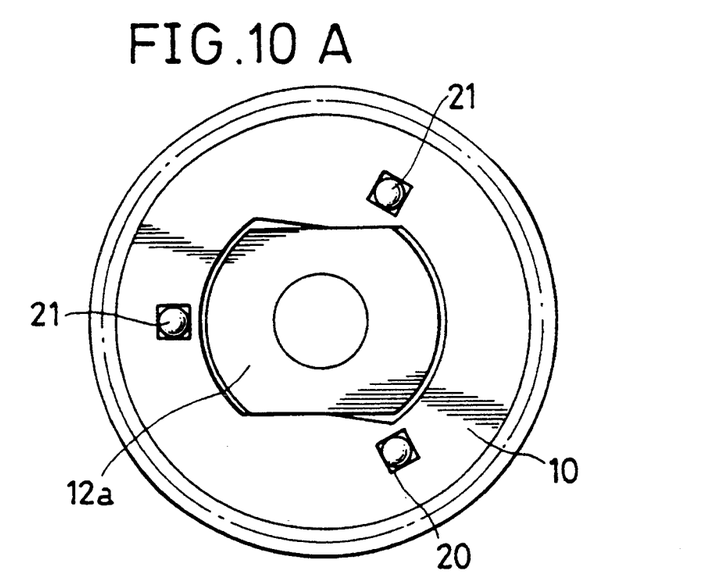
FIG. 10(a) shows a section of cuntion of the support shaft and the follower gear before their rotation and FIG. 10(b) is a section after they rotate.

Of the drawings of the present invention, FIG. 7 is a side elevation of one example of such a conventional stay housable type motor driven mirror, FIG. 8 is a transversal section showing an interior construction of the mirror, FIG. 9 is an exploded perspective view of the construction, FIG. 10(a) depicts a section of an operative relation between a support shaft and a follower gear before the gear rotates and FIG. 10(b) shows another section similarly to FIG. 10(a) after the gear rotates.

According to the stay housable type motor driven mirror, a mirror body 2 supporting a mirror glass is attached to a top end of the stay 1 curved about in a shape of crank, a foundation of the stay 1 is assembled into a bracket case 4 attached to a vehicle body 3. The stay 1 is driven by a drive mechanism 5 installed in the bracket case 4. The drive mechanism 5 is adapted to transfer power of the drive motor 6 to the support shaft 11 supporting the stay 1 through speed reduction mechanism 7, clutch mechanism 8, drive gear 9, and follower gear 10 so as to rotate the shaft 11. As shown in FIG. 8, the support shaft 11 has a reducing lower end 12a and an enlarged upper end or flanged portion 12. The lower end 12a is engaged with the follower gear 10 with a play along a predetermined direction. Rotational force of the follower gear 10 can be transferred to the support shaft 11 after the rotation passes such play zone.

There is a first engagement means 15 between facing faces of the upper flanged portion 12 and an upper lid 14 of the bracket case 13. There is a second engagement means 17 between the follower gear 10 and a lower lid 16 of the bracket case 13. The first engagement means 15 consists of a groove 18 formed on a rear side of the flanged portion 12 of the support shaft 11 and a convex portion 19 formed on the upper lid 14 of the bracket case 13. This groove 18 and the convex portion 19 are engaged with each other. The second engagement means 17 consists of a slanted concave portion 20 of the follower gear 10, an hole 22 formed on the lower lid 16 of the bracket case 13, and a ball 21 placed in the concave portion 20 and the hole 22.

The sectional shape of the slanted concave portion 20 is similar to a saucer and the ball 21 can ride or climb along the slanted side wall of the saucer.

When the drive motor 6 of the drive mechanism 5 drives the drive gear 9 and rotation of the drive gear 9 is transferred to the follower gear 10, first the support shaft 11 moves upward until the follower gear 10 contacts the reducing lower end portion 12a of the support shaft 11 go as to release an engagement condition of the ball 21 of the second engagement means 17 and the concave portion 20 of the follower gear 10, simultaneously release another engagement condition of the convex portion 19 of the first engagement means 15 and the groove 18.

It is noted that the first engagement means 15 is a combination of the groove 18 and the convex portion 19, and second engagement means 17 is a combination of the slanted concave portion 20, the ball 21 and hole 22. An urging and resilient force of a coil spring 23 makes them combined in order to prevent the support shaft 11, or the stay 1 from rotating.

Consequently, when driving of the drive mechanism 5 rotates the follower gear 10, the ball 21 climbs the slanted side wall of the slanted convex portion 20 and an engagement condition of the second engagement means 17 is released against the resilient force of the spring 23. Simultaneously, the support shaft 11 is pushed up and the engagement condition of the first engagement means 15 is released or disengaged, the follower gear 10 rotates the support shaft 11 after rotation of the gear 10 passes the play zone, and the stay 1 rotates, thus moving the mirror body 2.

The clutch mechanism 8 placed at a drive side of the stay housable type motor driven mirror according to the present invention has a pair of convex portion 26 and concave portion 25, respectively formed on an upper face of the drive gear 9 and a lower face of the pressing plate 24. During a driving period of the motor driven mirror, the convex portion 26 and concave portion 25 are engaged with each other, so a force of the drive motor 6 and the speed reduction gear mechanism 7 is transferred from the pressing plate 24 to the drive gear 9, rotating the follower gear 10 as described above. When the mirror body 2 is given some force from the outside, the stay 1 has a large load or stress, and rotation force is transferred reversely from the follower gear 10 to the drive gear 9, an engagement of the clutch mechanism 8 is disengaged resisting a force of the spring 27, no load is applied to the speed reduction gear mechanism 7, and the drive motor 6 is prevented from injuring itself such as burning and the like.

As described above, in the stay housable type driven mirror of the present invention, the engagement means 15 and 17 adapted to be effective by spring force supports the support shaft 11 without play or firmly resulting a stable holding of the stay 1 of the motor driven mirror. In addition, because the support shaft 11 for holding and rotating the stay 1 doesn't rotate before these first and second engagement means 15 and 17 are disengaged, it is possible to drive or rotate the stay 1 or support shaft 11 by a drive mechanism of relatively small in size.

However, when the mirror body 2 of the conventional stay housable type motor driven mirror takes an outside force and the support shaft 11 is compulsorily made to rotate, a load of the outside force is transferred to the drive gear (small gear) 9 since the clutch mechanism 8 having a shock absorbing function is installed on the drive gear 9. Consequently, a design allowance of a clutch holding torque is made small and it fears that suitable shock absorbing effect is not attained. In addition, because a clutch engaging spring 27 is installed at the driving side of the motor driven mirror, the height of the drive mechanism including the clutch mechanism disadvantageously increases resulting in a large size of whole construction of the mirror.

Additionally, according to the prior art of the mirror, the drive motor 6, speed reduction gear mechanism 7, and drive gear 9 are longitudinarily arranged, thereby a height H of the bracket case 14 increases, a degree of freedom in designing of the motor driven mirror, when it is attached to the vehicle, decreases, and design allowance of size of construction parts and arrangement of them in an interior of the bracket case 14 is not sufficient.

SUMMARY OF THE INVENTION

The present invention provides a stay housable or storageable type motor driven mirror having a stay, a support shaft, and a drive means, which stay supporting a mirror body at its top end, a foundation of the stay being attached to the support shaft rotatably held in a bracket case, and the support shaft being rotatably driven by the drive means. The stay housable type motor driven mirror comprises a drive gear rotatably driven by the drive mechanism, a clutch gear installed on a side of the support shaft so as to idlingly rotate or slide thereon and engaged with the drive gear, a clutch holder inserted in the support shaft at a position beneath the clutch gear so as to rotate the support shaft when it rotates, a clutch mechanism comprising a paired of convex portion and concave portion, respectively formed on the lower face of the clutch gear and the upper face of the clutch holder so as to engage with each other, and a spring for pressing the clutch gear in order to engage the convex portion and the concave portion of the clutch mechanism with each other, wherein the clutch mechanism is installed at a follower side of a large diameter gear increasing a design allowance of clutch holding torque.

In addition, the stay housable type motor driven mirror of the present invention comprises the drive gear rotatably driven by the drive mechanism or apparatus, a clutch holder fitted onto a lower end portion of the support shaft in order to rotate the support shaft, a clutch gear idlingly fitted on a boss portion of the clutch holder so as to slip and be engaged with the drive gear, a clutch mechanism comprising a concave face and a convex face respectively formed on the lower face of the clutch gear and the upper face of the flanged portion of the clutch holder so as to engage with each other, a first spring for pressing the clutch gear so as to make the convex face and concave face of the clutch mechanism engaged with each other, and a second spring for pressing the clutch holder. As a result, when the mirror body is given an outside force and the stay is compulsorily rotated, the clutch mechanism is disengaged, the support shaft and the clutch holder slip on the clutch gear, thus preventing the gears of the drive mechanism from being broken.

Further, the clutch mechanism is placed at a side of following fear gear of large diameter and the clutching spring is independently installed, so that a load given to the clutch decreases, wear of the clutch decreases, and a design allowance of clutch holding torque increases.

Also, according to the stay housable type motor driven mirror of the present invention, the drive portion of the drive apparatus is transversely arranged, a drive bevel gear is fitted onto the output shaft of the drive portion, and a mid bevel gear mechanism simultaneously engaging with the drive bevel gear and the clutch gear of the follower portion placed at a mid position of the drive portion of the drive apparatus and the follower portion, so that the height of the bracket case is shortened, a design flexibility as to an attachment to the car body increases, and the mid shaft has a bearing portion supporting the output shaft formed therein. Consequently, an interior space of the bracket case increases, a design allowance or flexibility concerning sizes and arrangement layout of the constituent parts or members in the interior space, increases and the attachment of them is simplified.

Consequently, a first purpose of the present invention is to provide a stay housable type motor driven mirror having a sufficient design flexibility given to a holding torque of the clutch due to an installation of the clutch mechanism formed at a side of the follower portion, and enabling to be miniatuarized.

It is a second purpose of the present invention to provide a stay housable type motor driven mirror wherein, when an outside force is given to the mirror body and the stay is compulsorily rotated, the clutch mechanism is disengaged, and the support shaft and the clutch holder slip on the clutch, this gear preventing the gear of the drive mechanism from being broken. The clutch mechanism is placed at a side of a follower of a large diameter gear and the clutching spring is independently installed in order to decrease a load given to the clutch and decrease wear of the clutch. As a result, a design allowance of clutch holding torque increases.

It is a third purpose of the present invention to provide a stay housable type motor driven mirror wherein the drive portion of the drive apparatus is transversely arranged decreasing a height of the bracket case, increasing a design flexibility of mirror attachment to the car body, providing a bearing portion supporting the output shaft on the mid shaft, so that the interior space of the bracket case increases and a design allowance of sizes and arrangement layout of the constitutional parts or members increases, and the installation of the motor driven mirror simplifies.

PREFERRED EMBODIMENT

The stay housable type motor driven mirror of the present invention will be explained with reference to FIG. 1, FIG. 2 and FIG. 7.

A mirror body 2 supporting a mirror glass is attached to a top end of the stay 1. The foundation of the stay 1 is assembled in the bracket case 4 installed on the car body 3 and driven by a drive mechanism 5 placed within the bracket case 4.

The drive mechanism 5 of the stay housable type motor driven mirror according to the present invention has a drive motor 31, a speed reduction mechanism 32, and a drive gear 33 mounted on an output shaft 32a of the speed reduction mechanism 32. At a lower end portion of the support shaft 36 supporting the stay 1 and rotatably held in the bracket case 4, a follower gear 37 is fitted. The follower gear 37 consists of a clutch gear 37a idle-rotatably fitted to the support shaft 36 and engaged with the drive gear 33, and a clutch holder 37b engaged with the clutch gear 37a through a clutch mechanism 37c.

Figure 1:
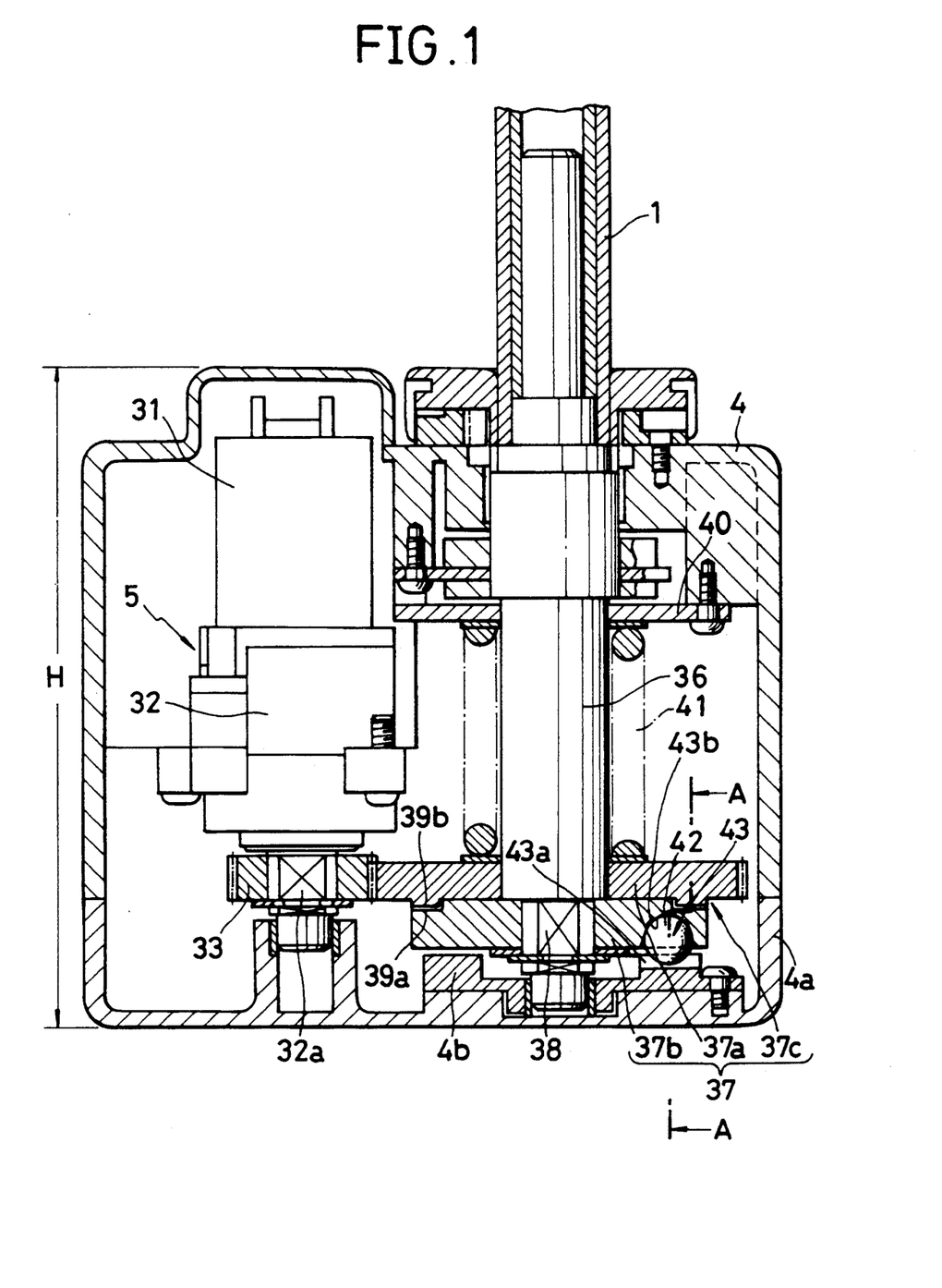
FIG. 1 is a longitudinal section of the interior construction of the stay housable or storable type motor driven mirror according to one embodiment of the present invention.
Figure 2:
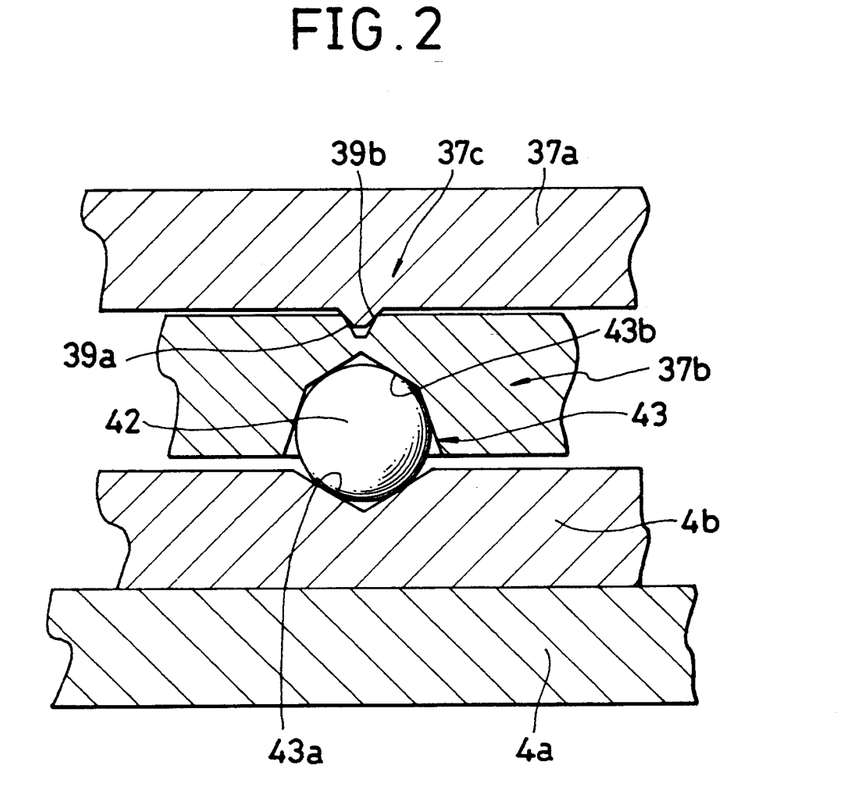
FIG. 2 is a section taken along line A—A of FIG. 1.

As shown in FIG. 10(a) depicting the conventional stay housable type motor driven mirror, the invention as shown in FIGS. 1 and 2 depicts that the clutch holder 37b is fitted to the dia-reduced portion 38 at a lower end of the support shaft 36 with a play movement along a predetermined direction.

It is noted that the clutch mechanism 37c has a V-shaped protrusion 39b and a V-shaped groove 39a, respectively formed on the lower face of the clutch gear 37a and on the upper face of the clutch holder 37b. The clutch mechanism 37c functions when these V-shaped protrusion 39b and V-shaped groove 39a are engaged with each other. The clutch mechanism 37c is always urged to engage by means of a coil spring 41 placed between the clutch gear 37a and a spring holder 40 attached to an inner face of the bracket case 4.

An engagement means 43 placed on the lower face of the clutch holder 37b consists of a slanted concave portion 43a formed in a base member 4b secured in a lid member 4a placed at a lower interior of the bracket case 4, a ball 42, and a concave portion 43b as shown in FIG. 2. The coil spring 41 urges the engagement means 43 and also the clutch mechanism 37c.

As shown in FIG. 2, slanted concave portion 43a is shallower than concave portion 43b, so that ball 42 relatively easily comes off of and out of place from slanted concave portion 43a. In other words, concave portion 43b is deeper than slanted concave portion 43a, and ball 42 is accommodated in the relatively deep bottom of concave portion 43b, so that it is relatively more difficult for ball 42 to come off from concave portion 43b.

When the drive gear 33 is rotatably driven by the drive motor 31 and the speed reducing mechanism 32, the follower gear 37 comprising the clutch mechanism 37c, clutch gear 37a, and clutch holder 37b rotates as a unit, a rotation of the follower gear 37 is transferred to the support shaft 36 to revolve the stay 1 and to move the mirror body 2.

When the mirror body 2 is an given outside force and the support shaft 36 is forcibly rotated, the clutch mechanism 37c is disengaged against a force of the coil spring 41, and the clutch holder 37b idlingly rotates on the clutch gear 37a preventing the outside force from being transferred to the drive mechanism.

As apparent from the description above, the stay housable type motor driven mirror according to the present invention comprises the drive gear 33 rotatably driven by the drive mechanism 34, a clutch gear 37a rotatably fitted to the support shaft 36 and engaged with the drive gear 33, a clutch holder 37b fitted to the support shaft 36 beneath the clutch gear 37a so as to rotate the support shaft 36 when it rotates, a clutch mechanism 37c comprising the convex face and concave face, respectively formed on the lower face of the clutch gear 37a and on the upper face of the clutch holder 37b so as to engage with each other, and a spring 41 for pressing the clutch gear 37a so as to make the convex and the concave faces of the clutch mechanism 37c engaged, wherein the clutch mechanism 37c for giving shock absorbing function when the mirror body 2 is given an outside force is provided at a side of the follower, thereby it is possible to give a design allowance to the clutch holding torque surely making the shock absorbing function effective. In addition, no spring for the clutch at a side of driving is necessary resulting in a possibility of 1 decrease of the height of the drive portion (H size in FIG. 1), of a miniatuarization of the whole size of the motor driven mirror, and of a decrease of the number of parts of the motor driven mirror of the present invention.

Figure 3:
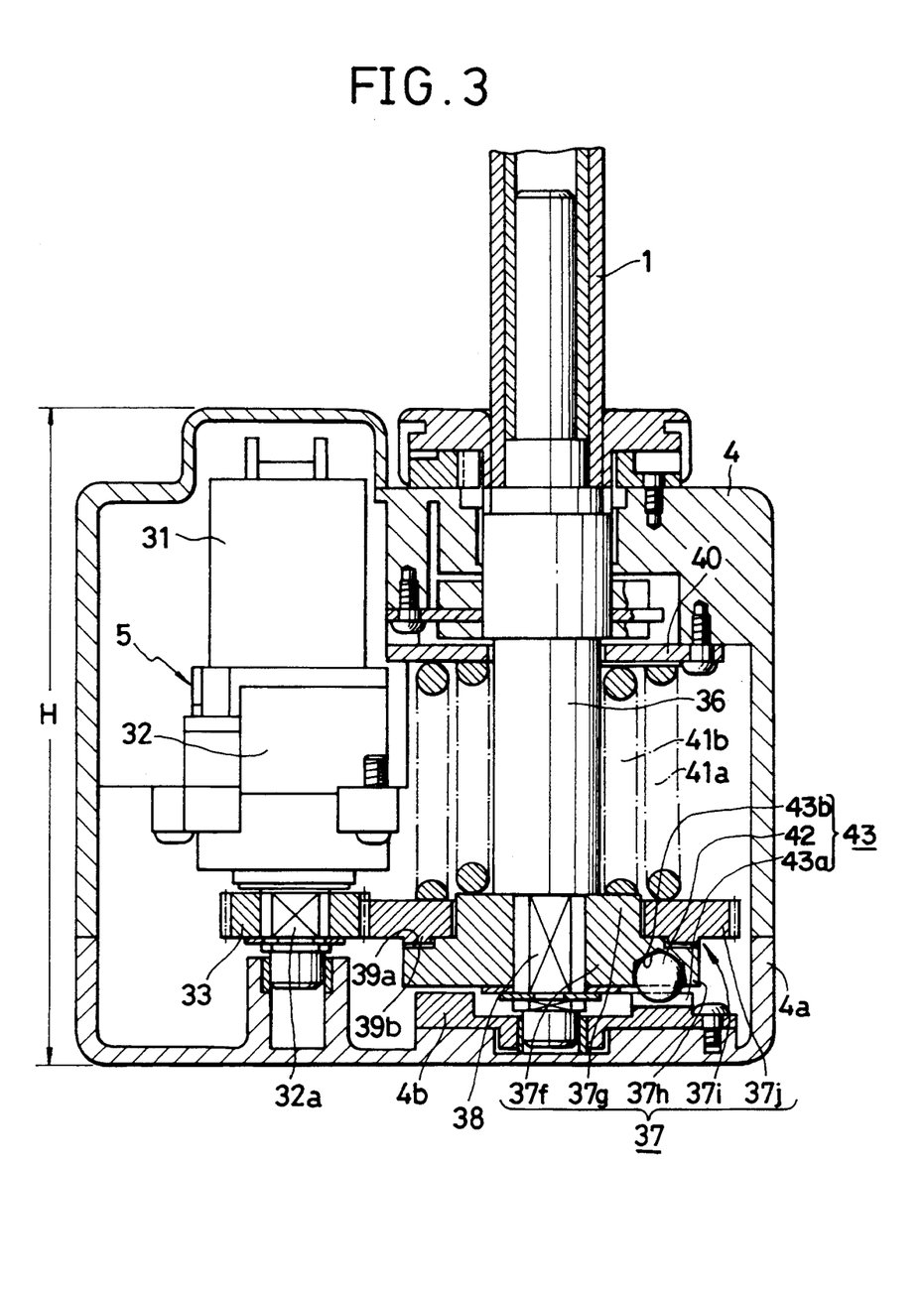
FIG. 3 is a view similar to FIG. 1, but of another embodiment.

FIG. 3 depicts another or second embodiment of the stay housable type motor driven mirror. Respective corresponding parts or members of the second embodiment shown in FIG. 3 have the same reference numerals as that of FIG. 1.

According to the second embodiment of the present invention, a drive mechanism or apparatus 5 has a drive motor 31, a speed reducing gear mechanism 32, a drive gear 33 provided on an output shaft 32a of the speed reducing gear mechanism 32. A follower gear 37 is fitted to a lower end portion of the support shaft 36 rotatably held in the bracket case 4 so as to hold a stay 1. The follower gear 37 comprises a clutch holder 37f fitted to a lower end portion of the support shaft 36 so as to rotate the support shaft 36, and a clutch gear 37j engaged with the drive gear 33 and with the flanged portion 37h of the clutch holder 37f through a clutch mechanism 33i. The clutch holder 37f is fitted to the dia-reduced portion 38 formed on the lower end of the support shaft 36 with a play along a predetermined rotational direction as shown in FIG. 10(a) depicting the conventional stay housable type motor driven mirror.

The clutch mechanism 37i has a pair of V-shaped groove 39a and V-shaped protrusion 39b, respectively formed on an upper face of the flanged portion 37h of the clutch holder 37f and on a lower face of the clutch gear 37j. When these V-shaped groove 39a and V-shaped protrusion 39b are engaged with each other, a clutching function of the clutch mechanism 37i is done. The clutch mechanism 37i is always urged toward a direction of its engagement by means of a first coil spring 41a interposed between the upper face of the clutch gear 37j and a spring pressor 40 attached to an inner face of the bracket case 4. An engagement means 43 is provided on the lower face of the clutch holder 37f. The construction of the engagement means 43 is the same as that of the engagement means shown in FIG. 2 and it has a combination of the slanted concave portion 43a, ball 42, and concave portion 43b. The engagement means 43 is always urged along its engagement direction by a second coil spring 41b inserted between an upper face of a boss portion 37g of the clutch holder 37f and the spring pressor 40. In short, the stay housable type motor driven mirror of the present invention has a set of coil springs 41a and 41b, so that no influence of the spring effective to the engagement means 43 is applied to the clutch mechanism 37i.

An operation of the stay housable type motor driven mirror will be explained. When the drive gear 33 is rotatably driven by a drive mechanism comprising the drive motor 31 and the speed reduction-mechanism 32, the clutch mechanism 37i of the clutch holder 37f and clutch gear 37j is kept engaged with each other and rotates as a unit of the follower gear 37, a rotation is transferred to the support shaft 36 rotating the stay 1 and moving the mirror body 2 fixed to the stay 1 as shown in FIG. 7.

When the mirror body 2 is given outside force and the stay 1 and the support shaft 36 are compulsorily rotated, engagement of the clutch mechanism 37c as shown in FIGS. 1 and 2 is disengaged against a force of the coil spring 41 and the clutch holder 37b idlingly rotates on the clutch gear 37a to prevent the outside force from being transferred to the drive mechanism.

Returning now to FIG. 3, as apparent from the description above, the stay housable type motor driven mirror of the present invention comprises the drive gear 33 rotatably driven by the drive mechanism or apparatus 34, the clutch holder 37f fitted to the lower end portion of the support shaft 36 so as to rotate the support shaft 36 through its rotation, a clutch gear 37j fitted to the boss portion 37g of the clutch holder 37f in a manner of idling rotation and engaged with the drive gear 33, the clutch mechanism 33i comprising the concave and the convex portions, respectively formed on the lower face of the clutch gear 37i and the upper face of the flanged portion 37h of the clutch holder 37f, the first spring 41a for pressing the clutch gear 37j so as to make the concave and the convex faces of the clutch mechanism 37j engaged, and the second spring 41b for pressing the clutch holder 37f. Consequently, urging force of the springs is divided in order to decrease a spring load given to the clutch mechanism 37i giving a shock absorbing effect to the stay 1 when outside force is given to the mirror body 2, wear of the clutching members decreases, and life-time and durability of the motor driven mirror improves.

Because that the clutch mechanism 37i is placed at a side of follower and two springs are installed in the motor driven mirror of the present invention, it is possible to give a design allowance to a clutch holding torque and make the shock absorbing effect sure or reliable. Also, clutching spring to be installed at a side of driving is made unnecessary, and length of the springs to be employed to the motor driven mirror can be shortened by employing to springs, resulting in short height (H size in FIG. 2) of the drive portion and miniaturization of the whole construction of the mirror.

Figure 4:
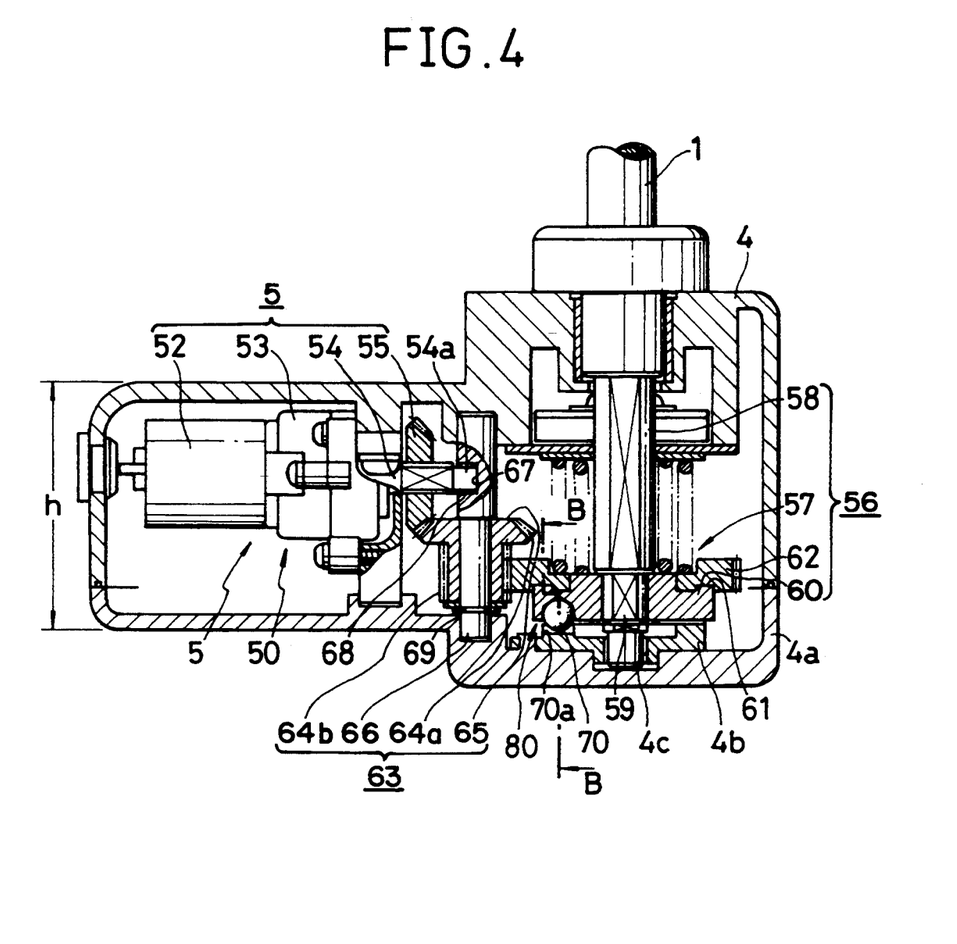
FIG. 4 is a view similar to FIG. 1, but of still another embodiment.
Figure 5:
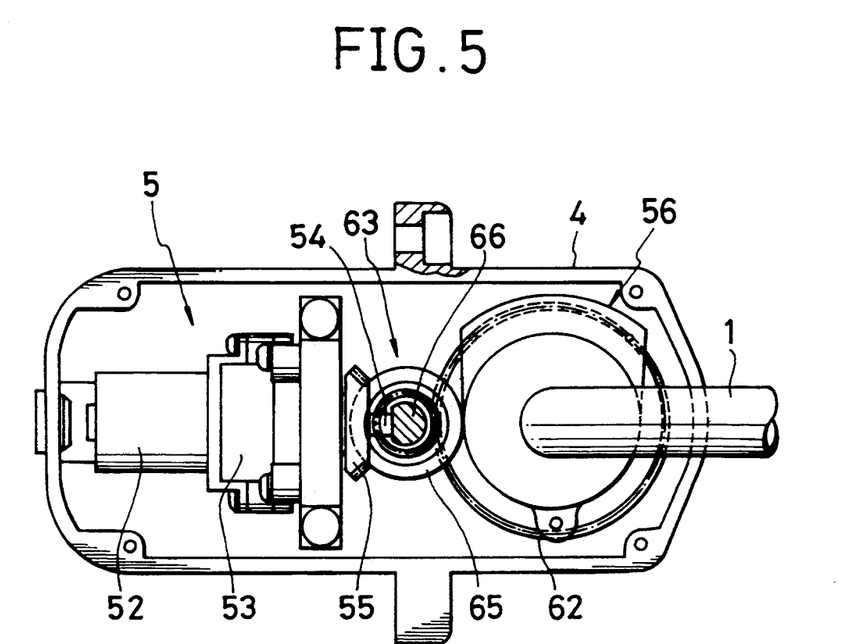
FIG. 5 is a plan view of the interior construction of the stay housable type motor driven mirror of the present invention.

The third embodiment of the stay housable type motor driven mirror of the present invention will be described with reference to FIG. 4–FIG. 6.

The drive portion 50 of the drive apparatus 5 of the third embodiment has an output shaft 54 for outputting a power of the drive motor 52 through the speed reduction gear mechanism 53, and a drive bevel gear 55 fitted onto the output shaft 54.

A follower gear mechanism 57 of a follower portion 56 of the drive apparatus 5 consists of a clutch holder 60 fitted onto a diameter reduced portion 59 placed on the lower portion of a support shaft 58 supporting a stay 1, and a clutch gear 62 fitted onto the clutch holder 60 and engaged with the clutch holder 60 through a clutch mechanism 61. A lowest portion of the support shaft 58 is journalled in a journal hole 4c of a base member 4b in a lid body 4a placed under the bracket case 4. An engagement means 80 is placed between the base member 4b and the clutch holder 60.

Figure 6:
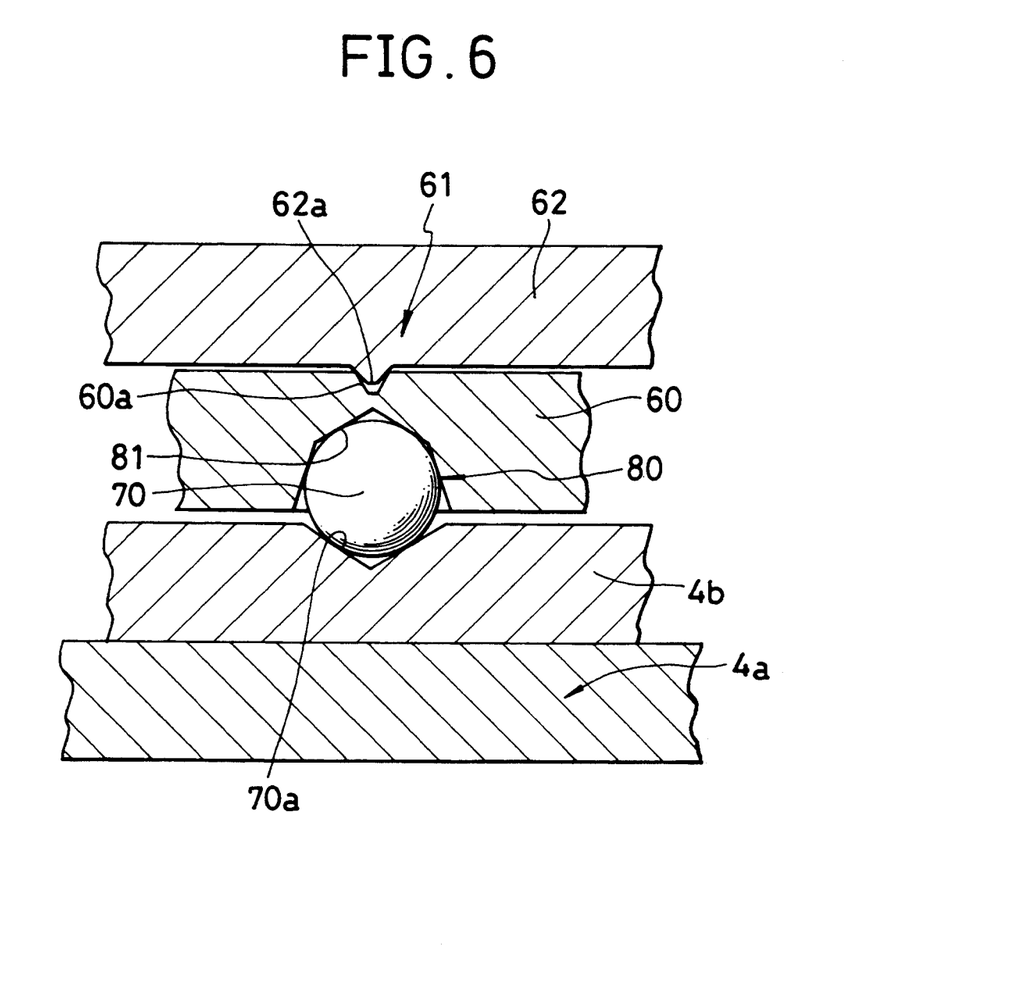
FIG. 6 is a section taken along line B—B of FIG. 4.

As apparently shown in FIG. 6, the clutch mechanism 61 has a pair of concave face 60a and convex face 62a, respectively formed on an upper face of the clutch holder 60 and a lower face of the clutch gear 62 so as to engage with to each other. A construction of the engagement means 80 shown in FIG. 6 is the same as that of the engagement means shown in FIG. 2. The engagement means 80 is a combination of a slanted concave portion 70a formed in the base member 4b, a concave portion 81 formed in the clutch holder 60, and a ball 70 placed between the slanted concave portion 70a and the concave portion 81.

Between or a mid position of the follower portion 56 and the drive portion 50 of the drive apparatus 5, there is a mid bevel gear mechanism 63. The mid bevel gear mechanism 63 comprises a bevel gear portion 64a engaged with a drive bevel gear 55 of the drive portion 50, a mid bevel gear 65 provided with a spur gear portion 64b engaged with the clutch gear 62 of the follower portion 56, and a mid shaft 66 on which the mid bevel gear 65 is loosely fitted. Both of upper end and lower end of the mid shaft 66 are journalled to the bracket case 4 and the lid body 4a. The mid shaft 66 has a bearing portion 67 formed therein to journal or support a front end portion 54a of the output shaft 54 of the drive portion 50. The front end portion 54a of the output shaft 54 is inserted into the bearing portion 67 through a bushing 68. An E ring 69 supporting the mid bevel gear 65 is attached to the mid shaft 66.

Operation of the third embodiment of the stay housable type motor driven mirror of the present invention will be explained.

When the drive motor 52 of the drive portion 50 of the drive apparatus 5 is driven, an output of the motor 52 is transferred to the output shaft 54 through the speed reduction gear mechanism 53, so the drive bevel gear 55 is rotatably driven. Further, the output is transferred to the mid bevel gear 65 of the mid shaft 66 and the clutch gear 62 of the follower portion 56 is rotatably driven through the spur gear portion 64b of the mid bevel gear 65. As a result, the clutch mechanism 61 rotates the support shaft 58 and stay 1 through the engaged clutch holder 60 and the mirror body 2 moves. Then, the ball 70 of the engagement means 80 is disengaged from the slanted groove portion 70a.

In case that an outside force is given to the mirror body 2 so as to forcibly rotate the stay 1 and the support shaft 58, the clutch mechanism 61 is disengaged and the clutch holder 60 slips on the clutch gear 62 preventing the outside force from being transferred to the drive portion 50.

As described above, according to the present invention, the drive portion 50 of the drive apparatus 5 is arranged transversely, the drive bevel gear 55 is fitted onto the output shaft 54 of the drive portion 50, the mid bevel gear 65 simultaneously engaged with the drive bevel gear 55 and the clutch gear 63 of the follower portion 56 and the mid shaft 66 fitted loosely on the mid bevel gear 65 are placed at a mid space of the drive portion 50 of the drive apparatus 5 and the follower portion 56, and the mid shaft 66 has the bearing portion 67 supporting the output shaft 54 formed therein, so that a height h of the bracket case 4 decreases and a design freedom or flexibility in attachement of the motor driven mirror to the car body. Further, an interior space of the bracket case 4 increases giving design allowance to the size and arrangement and the like of the constitutional parts of the mirror and simplifying a method and construction of the attachment above.

Although the stay housable type motor driven mirror of the present invention has been explained with reference to its preferred forms, it is to be understood to the person pertaining to the field that other forms might be adopted and all variations come within the meaning of the claims.

What is claimed is:

1. A stay housable type motor driven mirror comprising:

a stay provided with a mirror body attached to a top end of said stay, a support shaft rotatably held in a bracket case and rotated by a drive apparatus, a drive gear rotatably driven by said drive apparatus, a follower gear unit rotated by the drive gear, rotating said stay, and including a clutch mechanism for providing a damping function thereto when the mirror body is given an outside force, and a spring means for holdingly pressing the follower gear unit onto the clutch mechanism, wherein said follower gear unit and the spring means are arranged at a driven side opposite to the drive apparatus in the bracket case, and wherein said follower gear unit has a clutch gear enraging with said drive gear idlingly mounted on a side of the support shaft, a clutch holder fitted on the support shaft under the clutch gear in order to rotate said support shaft, and a clutch mechanism provided with a concave face and a convex one of said concave and convex faces being formed on a lower face of the clutch gear, and the other of said concave and convex faces being formed on an upper face of the clutch holder.

2. The stay housable type motor driven mirror according to claim 1, wherein an engagement member, having two concave portions and a ball, is arranged between the bracket case and said clutch holder; and wherein said spring means has a spring for urging said concave and convex faces of the clutch mechanism to engage with each other and for urging the ball of said engagement member to be engaged between the two concave portions.

3. The stay housable type motor driven mirror according to claim 2, wherein the engagement member, having the two concave portions and the ball, is arranged between the bracket case and the clutch holder; and wherein the spring means has a first spring for urging the concave face and the convex face of the clutch mechanism into mutual engagement, and a second spring for urging the ball of the engagement member into mutual engagement with and between the two concave portions.

4. The stay housable type motor driven mirror according to claim 2, wherein a drive portion and a driven portion of the drive apparatus are arranged in a manner of mutual transversal direction, a drive bevel gear is fitted onto an output shaft of the drive portion, and an intermediate bevel gear mechanism simultaneously engaging with the drive bevel gear and a clutch gear of the follower gear unit is provided at a mid position of the drive portion and the driven portion of the drive apparatus.

5. The stay housable type motor driven mirror according to claim 3, wherein the drive portion and the driven portion of the drive apparatus are arranged in a manner of mutual transversal direction, a drive bevel gear is fitted onto an output shaft of the drive portion, and an intermediate bevel gear mechanism simultaneously engaging with the drive bevel gear and a clutch gear of the follower gear unit is provided at a mid position of the drive portion and the driven portion of the drive apparatus.

6. The stay housable type motor driven mirror according to claim 2, wherein one concave portion of the engagement member is formed of a slanted shape and another concave portion has a depth deeper than said one concave portion in order to make the ball sink in depth.

7. The stay housable type motor driven mirror according to claim 6, wherein the slanted concave portion is provided at a bracket case side and another concave portion is formed on the lower face of said clutch holder.

8. The stay housable type motor driven mirror according to claim 4, wherein a mid shaft on which said mid bevel gear is freely fitted is provided on said bracket case and the mid shaft has a bearing provided thereon so as to journal the output shaft of the drive portion.

9. The stay housable type motor driven mirror according to claim 5, wherein the bracket case has thereon a mid shaft on which said mid bevel gear is freely fitted, and the mid shaft has a bearing provided thereon so as to journal the output shaft of the drive portion.

* * * * *